United States Patent
Lutz et al.

(10) Patent No.: US 11,203,960 B2
(45) Date of Patent: Dec. 21, 2021

(54) METHOD AND DEVICE FOR DETERMINING THE INJECTION QUANTITY OR THE INJECTION RATE OF A FLUID INJECTED INTO A REACTION SPACE BY MEANS OF AN INJECTOR

(71) Applicant: Vitesco Technologies GmbH, Hannover (DE)

(72) Inventors: Wolfgang Lutz, Brennberg (DE); Sebastian Beer, Nittendorf (DE); Susann-Nadine Unger, Neutraubling (DE)

(73) Assignee: VITESCO TECHNOLOGIES GMBH, Hannover (DE)

( * ) Notice: Subject to any disclaimer, the term of this patent is extended or adjusted under 35 U.S.C. 154(b) by 0 days.

(21) Appl. No.: 16/796,148

(22) Filed: Feb. 20, 2020

(65) Prior Publication Data

US 2020/0191033 A1   Jun. 18, 2020

Related U.S. Application Data

(63) Continuation of application No. PCT/EP2018/072278, filed on Aug. 16, 2018.

(30) Foreign Application Priority Data

Aug. 29, 2017 (DE) ..................... 10 2017 215 043.2

(51) Int. Cl.
  *F01N 3/20* (2006.01)
(52) U.S. Cl.
  CPC .......... *F01N 3/208* (2013.01); *F01N 2560/08* (2013.01); *F01N 2610/02* (2013.01);
  (Continued)

(58) Field of Classification Search
  CPC .. F01N 3/208; F01N 2560/08; F01N 2610/02; F01N 2610/14; F01N 2610/1406;
  (Continued)

(56) References Cited

U.S. PATENT DOCUMENTS

| 5,609,136 A | 3/1997 | Tuken |
| 9,588,016 B2 | 3/2017 | Ishizuka |

(Continued)

FOREIGN PATENT DOCUMENTS

| DE | 102006026928 A1 | 12/2007 |
| DE | 102013205799 A1 | 10/2013 |

(Continued)

OTHER PUBLICATIONS

Office Action dated Mar. 14, 2018 from corresponding German Patent Application No. DE 10 2017 215 043.2.

(Continued)

*Primary Examiner* — Audrey B. Walter

(57) ABSTRACT

A method and a device for determining the injection quantity or the injection rate of a fluid which is transported to an injector through a hydraulic line and is injected into a reaction space by the injector. The fluid pressure in the hydraulic line is measured by a pressure sensor, the fluid pressure at the injector is determined using the pressure measured by the pressure sensor and a stored transmission function of the hydraulic line, and the injection quantity or the injection rate of the fluid injected by the injector is determined using the fluid pressure determined at the injector.

9 Claims, 3 Drawing Sheets

(52) U.S. Cl.
CPC .... *F01N 2610/14* (2013.01); *F01N 2610/146* (2013.01); *F01N 2610/148* (2013.01); *F01N 2900/1808* (2013.01)

(58) Field of Classification Search
CPC ....... F01N 2610/144; F01N 2610/1453; F01N 2610/146; F01N 2610/148; F01N 2900/1808; F02D 41/2438; F02D 41/2467; F02D 41/2477; F02D 41/34; F02D 41/40; F02D 2041/1433; F02D 2200/0616; F02D 2250/04; F02D 2250/31; F02D 2260/06
See application file for complete search history.

(56) References Cited

U.S. PATENT DOCUMENTS

| | | | |
|---|---|---|---|
| 2004/0089234 A1 | 5/2004 | Hagglund et al. | |
| 2008/0027624 A1 | 1/2008 | Kloos et al. | |
| 2013/0036724 A1* | 2/2013 | Hodgson | F01N 3/208 60/286 |
| 2013/0048096 A1* | 2/2013 | Raeymaeckers | F04B 49/08 137/12 |
| 2013/0261930 A1 | 10/2013 | Kurtz et al. | |
| 2015/0159536 A1* | 6/2015 | Hodgson | F01N 11/00 60/274 |
| 2017/0101913 A1* | 4/2017 | Zapf | F01N 3/208 |
| 2018/0028974 A1* | 2/2018 | Lindahl | B01D 53/9431 |

FOREIGN PATENT DOCUMENTS

| | | |
|---|---|---|
| EP | 1884646 A2 | 2/2008 |
| JP | 2008144749 A | 6/2008 |
| WO | 2017/130104 A1 | 8/2017 |

OTHER PUBLICATIONS

International Search Report and Written Opinion dated Nov. 6, 2018 from corresponding International Patent Application No. PCT/EP2018/072278.

Korean Office Action dated Dec. 17, 2020 for corresponding Korean Patent Application No. 10-2020-7008999.

* cited by examiner

METHOD AND DEVICE FOR DETERMINING THE INJECTION QUANTITY OR THE INJECTION RATE OF A FLUID INJECTED INTO A REACTION SPACE BY MEANS OF AN INJECTOR

CROSS REFERENCE TO RELATED APPLICATIONS

This application is the U.S. national phase application of PCT International Application No. PCT/EP2018/072278, filed Aug. 16, 2018, which claims priority to German Patent Application No. DE 10 2017 215 043.2, filed Aug. 29, 2017, wherein the contents of such applications are incorporated herein by reference.

TECHNICAL FIELD

A method and to a device for determining the injection quantity or the injection rate of a fluid which is transported to an injector through a hydraulic line and is injected into a reaction space by the injector.

TECHNICAL BACKGROUND

AdBlue is a watery urea solution which consists of 32.5 percent urea and 67.5 percent demineralized water. It is known that the emission of nitrogen oxides from diesel engines can be reduced by up to 90 percent by means of such a solution. The known transparent solution is injected into the exhaust gas stream of a diesel vehicle and leads to a selective catalytic reduction (SCR). The nitrogen oxides and ammonia then react with each other, giving water and nitrogen. There is a need for a precise determination of the injection quantity of this urea-water solution into the exhaust gas stream of the diesel vehicle.

In a standard solution used, for example the injection quantity of an injector is compared with the delivery quantity of the fluid pump used. This assumes that the pump delivery quantity is determined sufficiently precisely. This high delivery precision incurs high costs.

Furthermore, in the case of petrol injection, it is known to control the injection quantity by means of a lambda control.

Furthermore, in the case of diesel injection, it is known to determine the injection quantity for example using a change in torque or rotation speed at specific load points.

Furthermore, it is already known to determine the transmission function of a hydraulic line using continuous hydraulic sine pressure waves at different frequencies. Such a continuous excitation however leads to reflections in the pressure measurement signal and makes it impossible to determine the transmission function correctly. Without a correctly determined transmission function, the injection quantity cannot be determined with sufficient accuracy.

What is needed is a way to provide a method and a device for determining the injection quantity or injection rate of a fluid transported to an injector through a hydraulic line and injected into a reaction space by means of the injector, which allow a more precise determination of the injection quantity or injection rate than the known methods.

Figure 1:
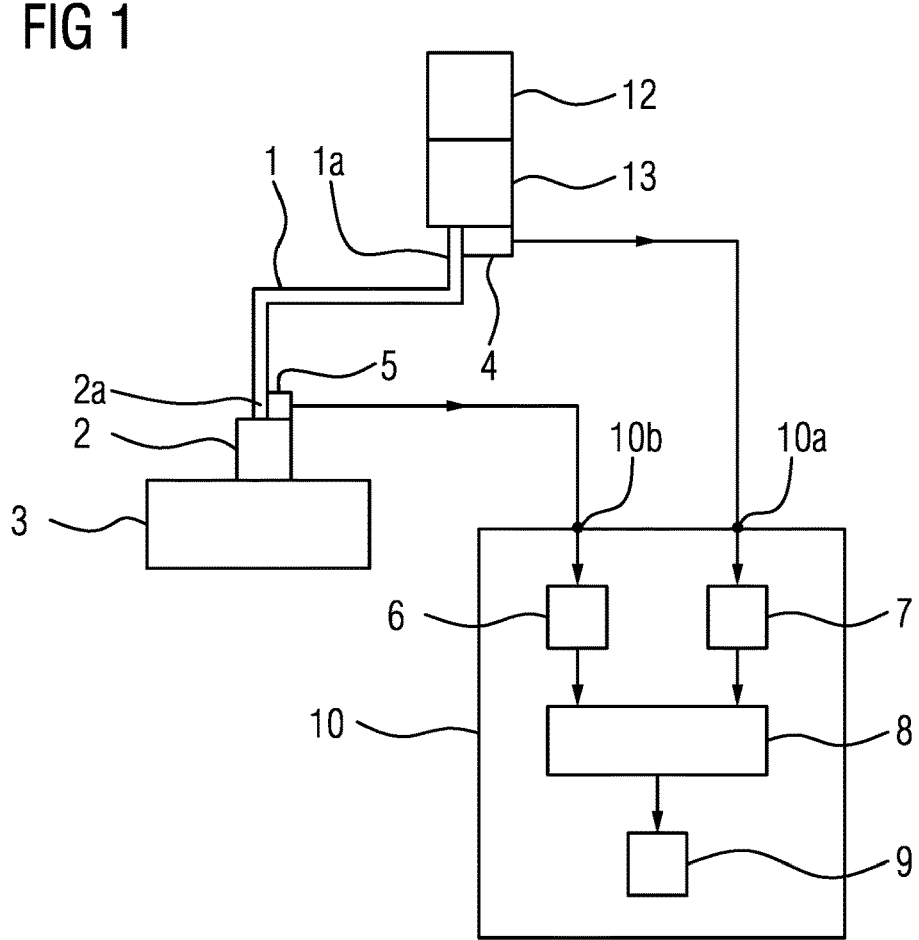
FIG. 1 shows a block depiction of a device for determining the transmission function of a hydraulic line.

These and other embodiments, aspects, advantages, and features of the present invention will be set forth in part in the description which follows and will become apparent to those skilled in the art by reference to the following description of the invention and referenced drawings or by practice of the invention. The aspects, advantages, and features of the invention are realized and attained by means of the instrumentalities, procedures, and combinations particularly pointed out in the appended claims and their equivalents.

DETAILED DESCRIPTION

The following detailed description includes references to the accompanying drawings, which form a part of the detailed description. The drawings show, by way of illustration, specific embodiments in which the apparatus may be practiced. These embodiments, which are also referred to herein as "examples" or "options," are described in enough detail to enable those skilled in the art to practice the present embodiments. The embodiments may be combined, other embodiments may be utilized, or structural or logical changes may be made without departing from the scope of the invention. The following detailed description is, therefore, not to be taken in a limiting sense and the scope of the invention is defined by the appended claims and their legal equivalents.

In one or more embodiments, in a method for determining the injection quantity or the injection rate of a fluid which is transported to an injector through a hydraulic line and is injected into a reaction space by means of the injector, the following are performed:

measurement of the fluid pressure in the hydraulic line by means of a pressure sensor, determination of the fluid pressure at the injector using the pressure measured by means of the pressure sensor and a stored transmission function of the hydraulic line, and determination of the injection quantity or injection rate of the fluid injected by means of the injector using the fluid pressure determined at the injector.

The advantages comprise the injection quantity or injection rate of a fluid injected into a reaction space by means of an injector in normal driving operation of the motor vehicle can be determined easily and precisely using the input signals from a pressure sensor measuring the fluid pressure in the hydraulic line and a transmission function of the hydraulic line stored in a memory of the motor vehicle.

Advantageously, by means of the pressure measured by the pressure sensor, a stored model is addressed which emits on the output side information on the injection quantity belonging to the measured pressure. In the stored model, the fluid pressure at the injector is determined by means of the measured pressure from the stored transmission function, and the injection quantity or injection rate is determined from the fluid pressure determined at the injector.

The information obtained may be used for example as part of an on-board diagnosis of the respective motor vehicle, to check whether or not the injection quantity or injection rate corresponds to a predefined nominal value. If not, an entry can be made in a fault memory and/or the absence of correlation of the injection quantity or injection rate with the predefined value indicated by means of a fault lamp. The invention helps the on-board diagnosis system provide accurate results, which is extremely important with respect to reducing the emission of undesirable pollutants.

FIG. 1 shows a block depiction of a device for determining the transmission function of a hydraulic line. This device is situated for example in a laboratory of a vehicle manufacturer or of a supplier to a vehicle manufacturer.

The device depicted has a fluid tank 12 containing a fluid, for example AdBlue, i.e. a watery urea solution consisting of 32.5% urea and 67.5% demineralized water. This fluid is pumped into a hydraulic line 1 by means of a fluid pump 13, and supplied to an injector 2 via this hydraulic line 1. When the injector 2 is opened, fluid is injected from the hydraulic line into a reaction space 3.

A first pressure sensor 4 is arranged in the inlet region 1a of the hydraulic line 1 and measures the fluid pressure in the inlet region 1a of the hydraulic line 1. The output signal from the first pressure sensor 4 is supplied to a first input 10a of a computing unit 10. A second pressure sensor 5 is arranged at the injector 2 and measures the fluid pressure in the inlet region of the injector 2. The output signal from the second pressure sensor 5 is supplied to a second input 10b of the computing unit 10.

The output signals from the first pressure sensor 4, supplied to the computing unit 10 via its input 10a, are subjected in the computing unit 10 to a transformation in the frequency space 7. The output signals from the second pressure sensor 5, supplied to the computing unit 10 via its input 10b, are also subjected in the computing unit 10 to a transformation in the frequency space 6.

In a block 8, the transmission function of the hydraulic line 1 is determined from the output signals of the two pressure sensors 4 and 5 which have each been subjected to transformation in the frequency space. The determined transmission function is stored in a memory 9.

In one or more embodiments, a model is produced which provides at its output, for a plurality of pressure measurement signals of the pressure sensor 4, information on the respective associated injection quantity of the fluid through the injector into the reaction space. The model is addressed by means of the respective pressure measurement signal. Using the pressure measurement signal and the stored transmission function of the hydraulic line, the associated pressure at the injector is determined in the model. The associated injection quantity of the fluid is determined from the determined pressure at the injector. Information on this injection quantity may be retrieved at the output of the model after the model has been addressed by means of the respective pressure measurement signal.

This model, including the determined transmission function of the hydraulic line, is stored in the memory 9 and may be transmitted at a later time to a memory arranged in a motor vehicle, so that said model is available for example for on-board diagnosis in normal driving mode of the motor vehicle.

The measurements of the fluid pressure in the hydraulic line 1, carried out above for the purpose of determining the transmission function of the hydraulic line, are advantageously determined after triggering a pressure jump in the fluid transported through the hydraulic line. This pressure jump is caused by the triggering of an ultra-fast switching valve, for example the injection valve of the injector 2. This utilizes the fact that injectors have a steep opening gradient. Therefore in the case of an injection process triggered by the opening of the injector, a sudden fall in fluid pressure in the hydraulic line 1 is provoked, which has an effect in the reverse direction as far as the inlet 1a of the hydraulic line 1. All frequency proportions are contained in such a jump. If this hydraulic pressure jump is introduced into the hydraulic line as a pressure wave, and the pressure signal is measured at the inlet and outlet of the hydraulic line, the transmission function of the hydraulic line can be determined precisely. This transmission function describes the damping of the line over the frequency. The acoustic velocity can be calculated frequency-dependently from a phase shift over the frequency.

Figure 2:
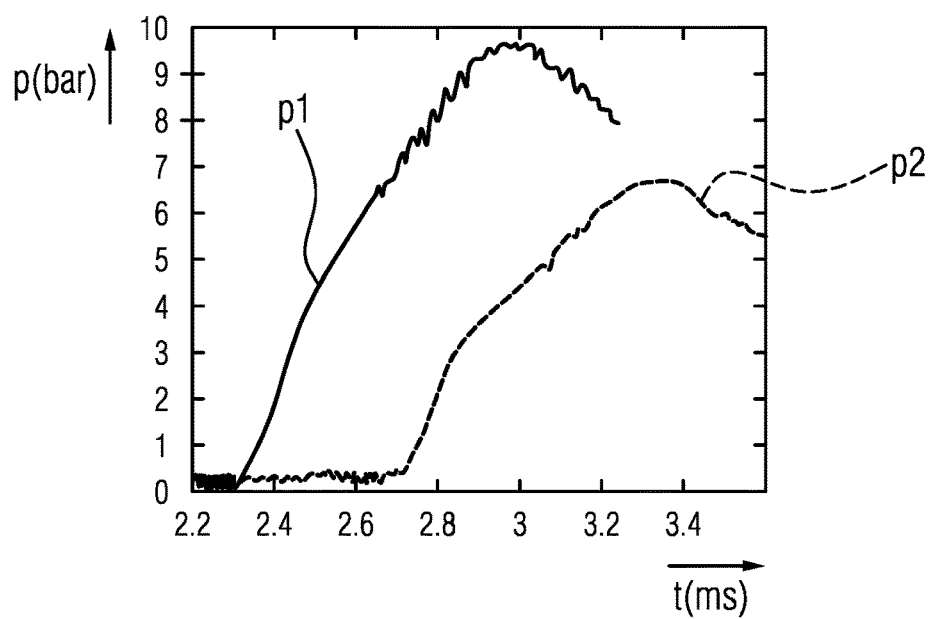
FIG. 2 shows a diagram in which the pressures are shown over time.

FIG. 2 shows a diagram in which the ordinate axis shows the pressure p in bar and the abscissa axis shows the time t in ms. Curve p1 illustrates the pressure development at the inlet to the hydraulic line at which the pressure jump was triggered. In the exemplary embodiment shown in FIG. 1, this is the pressure measured at the pressure sensor 5. Curve p2 illustrates the pressure development at the outlet from the hydraulic line. In the exemplary embodiment shown in FIG. 1, this is the pressure measured at the pressure sensor 4. It is evident that the two pressure curves shown in FIG. 2 are phase-shifted relative to each other, and that a damping occurs along the hydraulic line.

Figure 3:
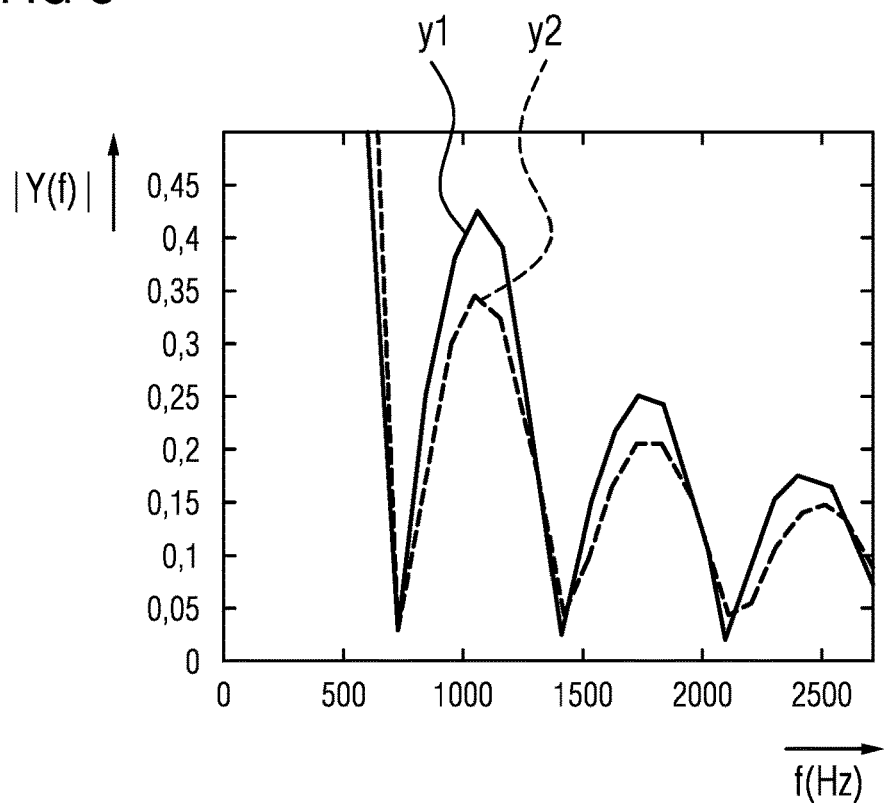
FIG. 3 shows a diagram in which the amount of the signals transformed in the frequency space is shown over the frequency.

FIG. 3 shows a diagram in which the ordinate axis shows the amount |Y(f)| of the signals transformed in the frequency space and the abscissa axis shows the frequency in Hz. Curve y1 illustrates the development of the amount of the input signal transformed in the frequency space, and curve y2 illustrates the development of the amount of the output signal transformed in the frequency space.

Figure 4:
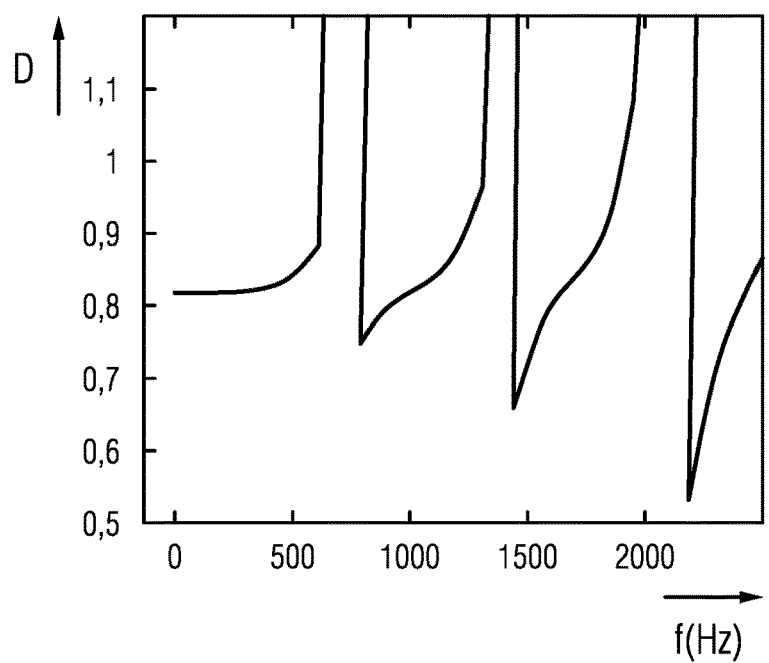
FIG. 4 shows a diagram in which the damping of the hydraulic line is shown over the frequency.

FIG. 4 shows a diagram in which the ordinate axis shows the damping D of the hydraulic line and the abscissa axis shows the frequency f in Hz. It is clear that the damping of the hydraulic line is frequency-dependent. The following relationship applies:

$$|G(f)|=Gout(f)/Gin(f),$$

wherein G(f) is the transmission function of the hydraulic line, Gout(f) is the output signal transformed in the frequency space, and Gin(f) is the input signal transformed in the frequency space.

Figure 5:
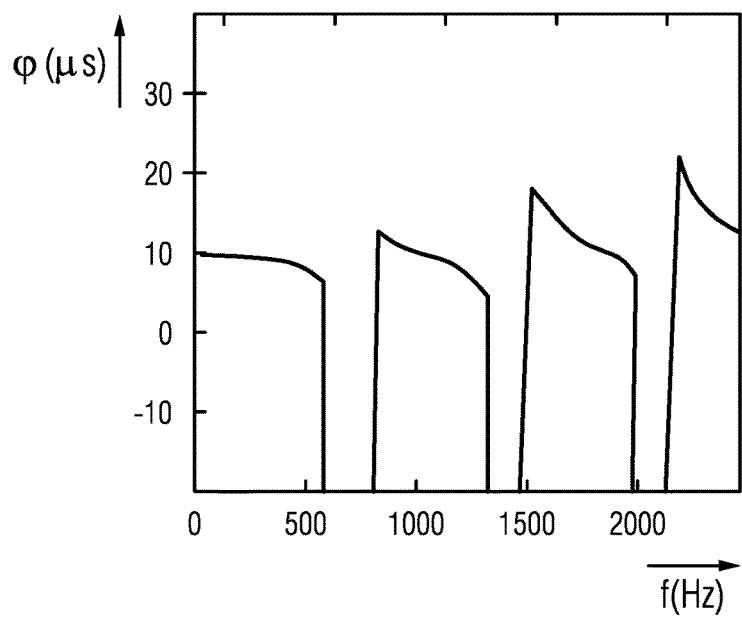
FIG. 5 shows a diagram in which the phase shift of the hydraulic line is shown over the frequency.

FIG. 5 shows a diagram in which the ordinate axis shows the phase shift damping ci of the hydraulic line and the abscissa axis shows the frequency f in Hz. It is clear that the phase shift of the hydraulic line is frequency-dependent. The following relationship applies:

$$\varphi(f)=\arctan(\operatorname{Im}\{G(f)\}/\operatorname{Re}\{G(f)\}),$$

wherein $\varphi(f)$ is the phase shift, and G(f) is the transmission function of the hydraulic line.

The system of fluid and line has either a normally dispersive or abnormally dispersive behaviour depending on the material of the hydraulic line. This means that the phase velocity is not equal to the group velocity. The acoustic velocity and the damping of the line are highly frequency-dependent.

For the injection quantity Q, the following relationship applies:

$$Q=(A/(\rho \cdot a)) \cdot \smallint p(dt).$$

For the injection rate Q_point, the following relationship applies:

$$Q\_point=(A/(\rho \cdot a)) \cdot p,$$

wherein A is the cross-sectional area of the hydraulic line, ρ is the total density of the fluid transported through the hydraulic line, and a is the total acoustic velocity.

For the acoustic velocity, the following relationships apply:

$$a=(K/\rho)^{1/2}$$

$$a=f(a_M, a_f, a_{ad})$$

$$a(f)=l/\varphi(f).$$

wherein:

K is the compression modulus, $a_M$ is the acoustic velocity in the material of the hydraulic line, $a_f$ is the acoustic velocity in the fluid, $a_{ad}$ is the acoustic velocity in the connection receivers of the hydraulic line, l is the length of the hydraulic line to be characterized.

As evident from the indicated relationship for the injection quantity Q, the injection quantity Q is proportional to the pressure p. In practice, the pressure sensor is arranged at varying distances from the injector. This means that the pressure signal measured by means of the pressure sensor is changed in frequency-dependent fashion by the respective disperse system (plastic hose, steel pipe etc.), and therefore the actual injection quantity or injection rate cannot be concluded with certainty from the measured pressure.

In one or more embodiments, in which the transmission function of the hydraulic line is determined after triggering of the pressure jump, the transmission function of the hydraulic line can be determined precisely and the injection quantity or injection rate can be determined precisely, using a model in which the transmission function is implemented, from the output signal of the pressure sensor arranged remotely from the injector. Thus greater pressure tolerances and component tolerances may be permitted, whereby amongst other things the costs are reduced.

Figure 6:
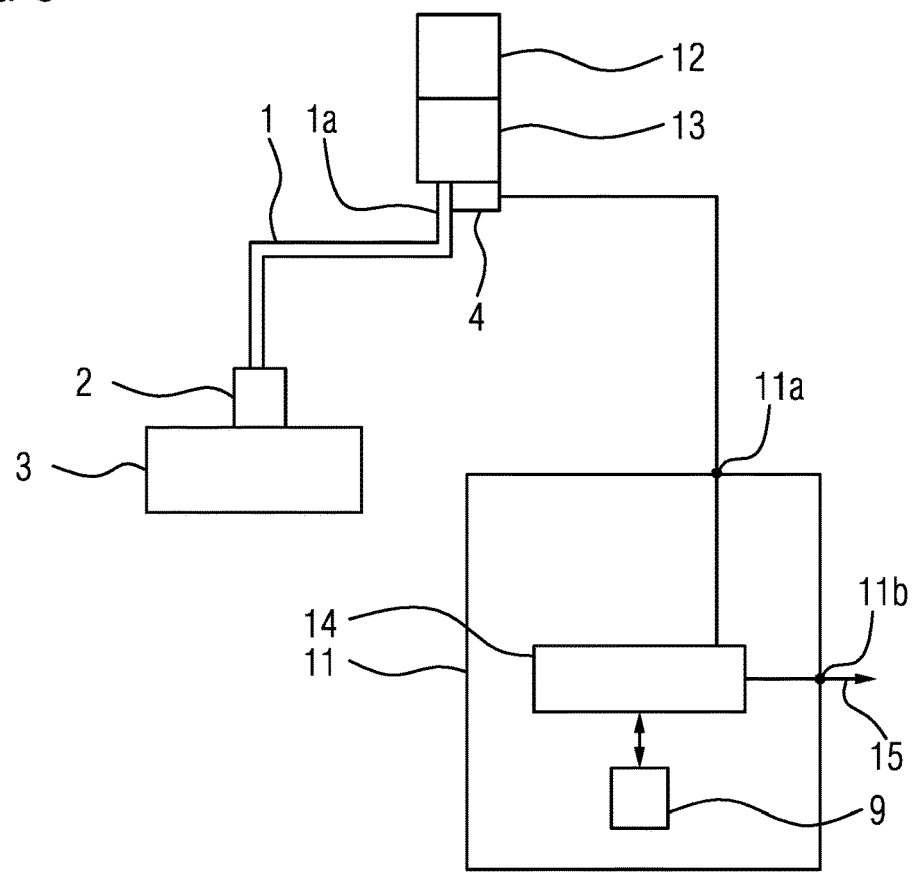
FIG. 6 shows a block depiction of a device for determining the injection quantity or the injection rate of a fluid which is transported to an injector through a hydraulic line and is injected into a reaction space by means of the injector.

FIG. 6 shows a block depiction of a device for determining the injection quantity or the injection rate of a fluid which is transported to an injector through a hydraulic line and is injected into a reaction space by means of the injector. This device is arranged in a motor vehicle and is used during on-board diagnosis to obtain information on the injection quantity or injection rate with which an AdBlue solution is injected into the exhaust gas stream of a diesel motor vehicle.

The device shown comprises a fluid tank 12 which contains an AdBlue solution. This AdBlue solution is pumped into a hydraulic line 1 by means of a fluid pump 13, and supplied to an injector 2 via this hydraulic line 1. When the injector 2 is opened, the AdBlue solution is injected from the hydraulic line by the injector 2 into a reaction space 3, which in the exemplary embodiment shown is an exhaust gas line of a diesel motor vehicle.

This injection process triggers a pressure fall in the hydraulic line 1 which propagates in the direction up to the inlet region 1*a* of the hydraulic line.

The pressure in the hydraulic line is measured there by means of the first pressure sensor 4. Its output signal is supplied to a control unit 11 via its input 11*a*, and passed on to a computer 14 in the control unit 11. Using the output signal of the first pressure sensor 4, this computer addresses the model stored in the memory 9, which is the model that was stored in the memory 9 as explained above in connection with FIG. 1. This model provides at its output 11*b* information 15 on the injection quantity or injection rate belonging to the respective pressure measurement signal. This information is output for example via the output 11*b* of the control unit 11, and compared to a predefined nominal injection quantity or nominal injection rate during an on-board diagnosis. If the deviations of the determined injection quantity or injection rate from a predefined nominal value are greater than a predefined threshold value, an entry is made in a fault memory and/or a fault lamp is actuated, which signals to the driver of the vehicle or a workshop technician that the measured injection quantity or injection rate has deviated unacceptably greatly from the predefined nominal value so that corresponding counter measures can be taken.

Advantageously, the transmission function is determined without occurrence of falsifications caused by reflections. To this end, the transmission function may be determined using a hydraulic line, the length of which is greater than the distance from the inlet of the line to the injector. This delays the pressure jump so that the reflections only run back after an applied measurement window. Alternatively, the transmission function of the hydraulic line may also be determined in that the injection system is loaded with a constant pressure and a single injection is performed in this steady state. Two pressure sensors are required to determine this transmission function. If the transmission function is known, then as described above the injection quantity or injection rate can be concluded with one pressure sensor.

The embodiments have been described above with reference to an exemplary embodiment in which an AdBlue solution is injected into an exhaust gas line of a diesel motor vehicle using an injection valve. The invention may however also be applied to diesel or petrol injection systems in which the respective fuel is injected into a combustion space of the motor vehicle using fuel injection valves. Furthermore, this method is also generally suitable for metering units, e.g. pumps.

The above description is intended to be illustrative, and not restrictive. Many other embodiments will be apparent to those of skill in the art upon reading and understanding the above description. Embodiments discussed in different portions of the description or referred to in different drawings can be combined to form additional embodiments of the present application. The scope should, therefore, be determined with reference to the appended claims, along with the full scope of equivalents to which such claims are entitled.

LIST OF REFERENCE SIGNS

1 Hydraulic line
1*a* Inlet region of hydraulic line
2 Injector
2*a* Inlet region of injector
3 Reaction space
4 First pressure sensor
5 Second pressure sensor
6 Fourier transformation
7 Fourier transformation
8 Determination of transmission function
9 Memory
10 Computing unit
10*a* First input of computing unit
10*b* Second input of computing unit
11 Control unit
11*a* Input of control unit
11*b* Output of control unit
12 Fluid tank
13 Fluid pump 14 Computer
15 Information on injection quantity

The invention claimed is:

1. A method for determining an injection quantity or an injection rate of a fluid which is transported to an injector through a hydraulic line and is injected into a reaction space by the injector, the method comprising:
   measuring fluid pressure in the hydraulic line by a first pressure sensor,
   determining the fluid pressure at the injector using the pressure measured by the first pressure sensor and a stored transmission function of the hydraulic line, and
   determining an injection quantity or injection rate of the fluid injected by the injector using the fluid pressure determined at the injector,
   wherein the transmission function of the hydraulic line is determined after triggering of a pressure jump in the fluid transported through the hydraulic line,
   wherein the transmission function is determined by a second pressure sensor, wherein one of the pressure sensors is arranged at an inlet to the hydraulic line and the other is arranged at an inlet to the injector.

2. The method as claimed in claim 1, wherein output signals of the two pressure sensors are each subjected to transformation in a frequency space, and the transmission function of the hydraulic line is determined from the two output signals of the pressure sensors which have been subjected to transformation in the frequency space.

3. The method as claimed in claim 1, wherein the transmission function is determined without an occurrence of hydraulic reflections.

4. The method as claimed in claim 1, wherein by way of the fluid pressure measured by the first pressure sensor, a stored model is addressed which emits on an output side information on the injection quantity or injection rate belonging to the measured pressure.

5. The method as claimed in claim 4, wherein in the stored model, the fluid pressure at the injector is determined by the measured pressure from the stored transmission function, and the injection quantity or injection rate is determined from the fluid pressure determined at the injector.

6. The method as claimed in claim 1, wherein the pressure jump is triggered by an ultra-fast switching valve.

7. The method as claimed in claim 6, wherein the ultra-fast switching valve includes an injector valve.

8. A device for determining an injection quantity or an injection rate of a fluid which is transported to an injector through a hydraulic line and is injected into a reaction space by the injector, the device comprising:
   a hydraulic line;
   an injector connected to the hydraulic line;
   a reaction space;
   a first pressure sensor configured to measure fluid pressure in the hydraulic line;
   a memory in which a transmission function of the hydraulic line is stored; and
   a control unit configured to determine the fluid pressure at the injector using pressure measured by the first pressure sensor and the stored transmission function, and to determine the injection quantity or the injection rate of the fluid injected by the injector using the determined fluid pressure at the injector,
   wherein the transmission function of the hydraulic line is determined after triggering of a pressure jump in the fluid transported through the hydraulic line,
   wherein the transmission function is determined by a second pressure sensor, wherein one of the pressure sensors is arranged at an inlet to the hydraulic line and the other is arranged at an inlet to the injector.

9. The device as claimed in claim 8, wherein when the fluid pressure at the injector using pressure is measured by the first pressure sensor, a model is stored in the memory which can be addressed by the pressure measured by the second pressure sensor, and at an output side emits information on the injection quantity belonging to the measured pressure.

* * * * *